(12) United States Patent
de Wit et al.

(10) Patent No.: US 11,703,392 B2
(45) Date of Patent: Jul. 18, 2023

(54) SEQUENTIAL BEAM SPLITTING IN A RADIATION SENSING APPARATUS

(71) Applicant: Calumino Pty Ltd., Eveleigh (AU)

(72) Inventors: Gabrielle de Wit, Pymble (AU); Marek Steffanson, Mosman (AU)

(73) Assignee: Calumino Pty Ltd., Eveleigh (AU)

( * ) Notice: Subject to any disclaimer, the term of this patent is extended or adjusted under 35 U.S.C. 154(b) by 0 days.

(21) Appl. No.: 17/835,794

(22) Filed: Jun. 8, 2022

(65) Prior Publication Data

US 2022/0299372 A1 Sep. 22, 2022

Related U.S. Application Data

(63) Continuation of application No. 17/066,396, filed on Oct. 8, 2020, now Pat. No. 11,371,890, which is a
(Continued)

(51) Int. Cl.
*G01J 5/20* (2006.01)
*G01J 5/02* (2022.01)
(Continued)

(52) U.S. Cl.
CPC .............. *G01J 5/20* (2013.01); *G01J 1/0414* (2013.01); *G01J 1/44* (2013.01); *G01J 5/0225* (2013.01);
(Continued)

(58) Field of Classification Search
CPC .... G01J 5/20; G01J 1/0414; G01J 1/44; G01J 5/0225; G01J 5/40; G01J 2005/0077;
(Continued)

(56) References Cited

U.S. PATENT DOCUMENTS 5,929,440 A 7/1999 Fisher
6,080,988 A 6/2000 Ishizuya et al.
(Continued)

FOREIGN PATENT DOCUMENTS

JP 2000241240 9/2000
JP 2006134715 5/2006
(Continued)

OTHER PUBLICATIONS

Title: On-board Radiation Sensing Apparatus U.S. Appl. No. 16/400,780, filed May 1, 2019 Status Date: Jan. 6, 2021 Inventor: Gabrielle de Wit Status: Patented Case.
(Continued)

*Primary Examiner* — Kiho Kim
(74) *Attorney, Agent, or Firm* — Greenberg Traurig

(57) ABSTRACT

Systems, methods, and apparatuses for providing electromagnetic radiation sensing using sequential beam splitting. The apparatuses can include a micro-mirror chip having a plurality of light reflecting surfaces, an image sensor having an imaging surface, and a beamsplitter unit located between the micro-mirror chip and the image sensor. The beamsplitter unit includes a plurality of beamsplitters aligned along a horizontal axis that is parallel to the micro-mirror chip and the imaging surface. The beamsplitters implement the sequential beam splitting. Because of the structure of the beamsplitter unit, the height of the arrangement of the micro-mirror chip, the beamsplitter unit, and the image sensor is reduced such that the arrangement can fit within a mobile device. Within a mobile device, the apparatuses can be utilized for human detection, fire detection, gas detection, temperature measurements, environmental monitoring, energy saving, behavior analysis, surveillance, information gathering and for human-machine interfaces.

20 Claims, 8 Drawing Sheets

Related U.S. Application Data continuation of application No. 16/400,831, filed on May 1, 2019, now Pat. No. 10,801,896.

(60) Provisional application No. 62/791,479, filed on Jan. 11, 2019, provisional application No. 62/791,193, filed on Jan. 11, 2019, provisional application No. 62/791,195, filed on Jan. 11, 2019.

(51) Int. Cl.
*G01J 5/40* (2006.01)
*G02B 26/08* (2006.01)
*G01J 1/04* (2006.01)
*G01J 1/44* (2006.01)
*G01J 5/10* (2006.01)
*G01J 5/00* (2022.01)

(52) U.S. Cl.
CPC .............. *G01J 5/40* (2013.01); *G02B 26/085* (2013.01); *G02B 26/0833* (2013.01); *G02B 26/0866* (2013.01); *G01J 2005/0077* (2013.01); *G01J 2005/106* (2013.01)

(58) Field of Classification Search
CPC .. G01J 2005/106; G01J 1/0407; G01J 1/0411; G01J 1/0437; G01J 1/08; G01J 1/4257; G01J 5/0803; G01J 5/0806; G01J 5/0831; G01J 5/0853; G02B 26/0833; G02B 26/085; G02B 26/0866; G02B 27/145
See application file for complete search history.

(56) References Cited

U.S. PATENT DOCUMENTS

| | | | |
|---|---|---|---|
| 7,491,922 | B1 | 2/2009 | Deliwala et al. |
| 9,110,354 | B2 | 8/2015 | Schmaelzle et al. |
| 9,228,989 | B2 | 1/2016 | Gerety et al. |
| 10,801,896 | B2 | 10/2020 | De Wit et al. |
| 10,900,842 | B2 | 1/2021 | De Wit |
| 11,371,890 | B2 | 6/2022 | De Wit et al. |
| 11,408,773 | B2 | 8/2022 | De Wit |
| 2003/0174928 | A1 | 9/2003 | Huang et al. |
| 2005/0162090 | A1 | 7/2005 | Birman et al. |
| 2006/0097053 | A1 | 5/2006 | Jolivet et al. |
| 2006/0111603 | A1 | 5/2006 | Shaw |
| 2007/0215703 | A1 | 9/2007 | Aoki et al. |
| 2009/0091726 | A1 | 4/2009 | Kalf et al. |
| 2010/0025581 | A1 | 2/2010 | Aksyuk et al. |
| 2011/0139990 | A1 | 6/2011 | Xie et al. |
| 2011/0304470 | A1 | 12/2011 | Su et al. |
| 2012/0005053 | A1 | 1/2012 | Burgess et al. |
| 2012/0050533 | A1* | 3/2012 | Dewa ................... G02B 27/145 348/143 |
| 2012/0261575 | A1 | 10/2012 | Averitt et al. |
| 2014/0321772 | A1 | 10/2014 | Michel et al. |
| 2015/0102234 | A1 | 4/2015 | Gargir et al. |
| 2015/0377711 | A1 | 12/2015 | Steffanson et al. |
| 2020/0225084 | A1 | 7/2020 | De Wit |
| 2020/0225092 | A1 | 7/2020 | De Wit et al. |
| 2021/0033470 | A1 | 2/2021 | De Wit et al. |
| 2021/0140831 | A1 | 5/2021 | De Wit |
| 2022/0364932 | A1 | 11/2022 | De Wit |

FOREIGN PATENT DOCUMENTS

| | | |
|---|---|---|
| JP | 2018056414 | 4/2018 |
| KR | 101273462 B1 | 6/2013 |

OTHER PUBLICATIONS

Title: On-board Radiation Sensing Apparatus U.S. Appl. No. 17/154,994, filed Jan. 21, 2021 Status Date: Jul. 20, 2022 Inventor: Gabrielle de Wit Status: Patented Case.
Title: On-board Radiation Sensing Apparatus U.S. Appl. No. 17/874,845, filed Jul. 27, 2022 Status Date: Sep. 13, 2022 Inventor: Gabrielle de Wit Status: Docketed New Case—Ready for Examination.
Title: Sequential Beam Splitting in a Radiation Sensing Apparatus U.S. Appl. No. 16/400,831, filed May 1, 2019 Status Date: Sep. 23, 2020 Inventors: Gabrielle de Wit, et al. Status: Patented Case.
Title: Sequential Beam Splitting in a Radiation Sensing Apparatus U.S. Appl. No. 17/066,396, filed Oct. 8, 2020 Status Date: Jun. 8, 2022 Inventors: Gabrielle de Wit, et al. Status: Patented Case.
International Search Report and Written Opinion, PCT/US2020/013178, dated May 15, 2020.
Sasaki, et al. "Varifocal scanning micro-mirror fabricated from silicon-on-insulator wafer." 16th international Solid-State Sensors, Actuators, and Microsystems Conferences, IEEE, 2022.

\* cited by examiner

SEQUENTIAL BEAM SPLITTING IN A RADIATION SENSING APPARATUS

RELATED APPLICATIONS

The present application is a continuation application of U.S. patent application Ser. No. 17/066,396, filed Oct. 8, 2020, which is a continuation application of U.S. patent application Ser. No. 16/400,831, filed May 1, 2019, issued as U.S. Pat. No. 10,801,896 on Oct. 13, 2020, which claims priority to Prov. U.S. Pat. App. Ser. No. 62/791,193, filed Jan. 11, 2019, entitled "ON-BOARD RADIATION SENSING APPARATUS", Prov. U.S. Pat. App. Ser. No. 62/791,195, filed Jan. 11, 2019, entitled "SEQUENTIAL BEAM SPLITTING IN A RADIATION SENSING APPARATUS", and Prov. U.S. Pat. App. Ser. No. 62/791,479, filed Jan. 11, 2019, entitled "RADIATION SENSING APPARATUS WITH A LIGHT SOURCE MOUNTED ON A FLEXIBLE PART", the entire disclosures of which applications are hereby incorporated herein by reference.

FIELD OF THE TECHNOLOGY

At least some embodiments disclosed herein relate to electromagnetic radiation detection using sequential beam splitting in general and more particularly but not limited to the sensing of infrared (IR) radiation using sequential beam splitting in a radiation sensing apparatus.

And, at least some embodiments disclosed herein relate to electromagnetic radiation detection using beam splitting in general and more particularly but not limited to the sensing of infrared (IR) radiation using beam splitting in a radiation sensing apparatus with the light source mounted on a flexible part. Also, disclosed herein is a printed circuit board arrangement with a flexible part for an electromagnetic radiation detector.

BACKGROUND

U.S. Pat. No. 9,857,229 discloses a method of fabricating electromagnetic radiation detection devices including: forming a first mask on a substrate; forming a structural layer on the substrate using the first mask; forming a metallic layer overlying the structural layer; removing the first mask; forming a second mask on the substrate, the second mask having mask openings; selectively patterning the metallic layer using the mask openings; and removing the second mask. The entire disclosure of U.S. Pat. No. 9,857,229 is hereby incorporated herein by reference.

U.S. Pat. No. 5,929,440 discloses an electromagnetic radiation detector that has an array of multi-layered cantilevers. Each of the cantilevers is configured to absorb electromagnetic radiation to generate heat and thus bend under the heat proportionately to the amount of absorbed electromagnetic radiation. The cantilevers are illuminated and light reflected by the bent cantilevers are sensed to determine the amount of electromagnetic radiation. The entire disclosure of U.S. Pat. No. 5,929,440 is hereby incorporated herein by reference.

U.S. Pat. No. 9,851,256 discloses a radiation detection sensor including a plurality of micromechanical radiation sensing pixels having a reflecting top surface and configured to deflect light incident on the reflective surface as a function of an intensity of sensed radiation. The sensor can provide adjustable sensitivity and measurement range. The entire disclosure of U.S. Pat. No. 9,851,256 is hereby incorporated herein by reference.

U.S. Pat. No. 9,810,581 discloses an electromagnetic radiation sensing micromechanical device to be utilized in high pixel-density pixel sensor arrays. Arrays of the device can be utilized as IR imaging detectors. The entire disclosure of U.S. Pat. No. 9,810,581 is hereby incorporated herein by reference.

SUMMARY OF THE DESCRIPTION

Described herein are systems, methods, and apparatuses for providing electromagnetic radiation sensing using sequential beam splitting. The apparatuses can include a micro-mirror chip having a plurality of light reflecting surfaces, an image sensor having an imaging surface, and a beamsplitter unit located between the micro-mirror chip and the image sensor. The beamsplitter unit includes a plurality of beamsplitters aligned along a horizontal axis that is parallel to the micro-mirror chip and the imaging surface. The beamsplitters implement the sequential beam splitting. Because of the structure of the beamsplitter unit, the height of the arrangement of the micro-mirror chip, the beamsplitter unit, and the image sensor is reduced such that the arrangement can fit in a space constrained device, such as a mobile device. Configured within a device, the apparatuses can be utilized for human detection, fire detection, gas detection, temperature measurements, environmental monitoring, energy saving, behavior analysis, surveillance, information gathering and for human-machine interfaces.

BRIEF DESCRIPTION OF THE DRAWINGS

The present disclosure will be understood more fully from the detailed description given below and from the accompanying drawings of various embodiments of the disclosure.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description.

Figure 1:
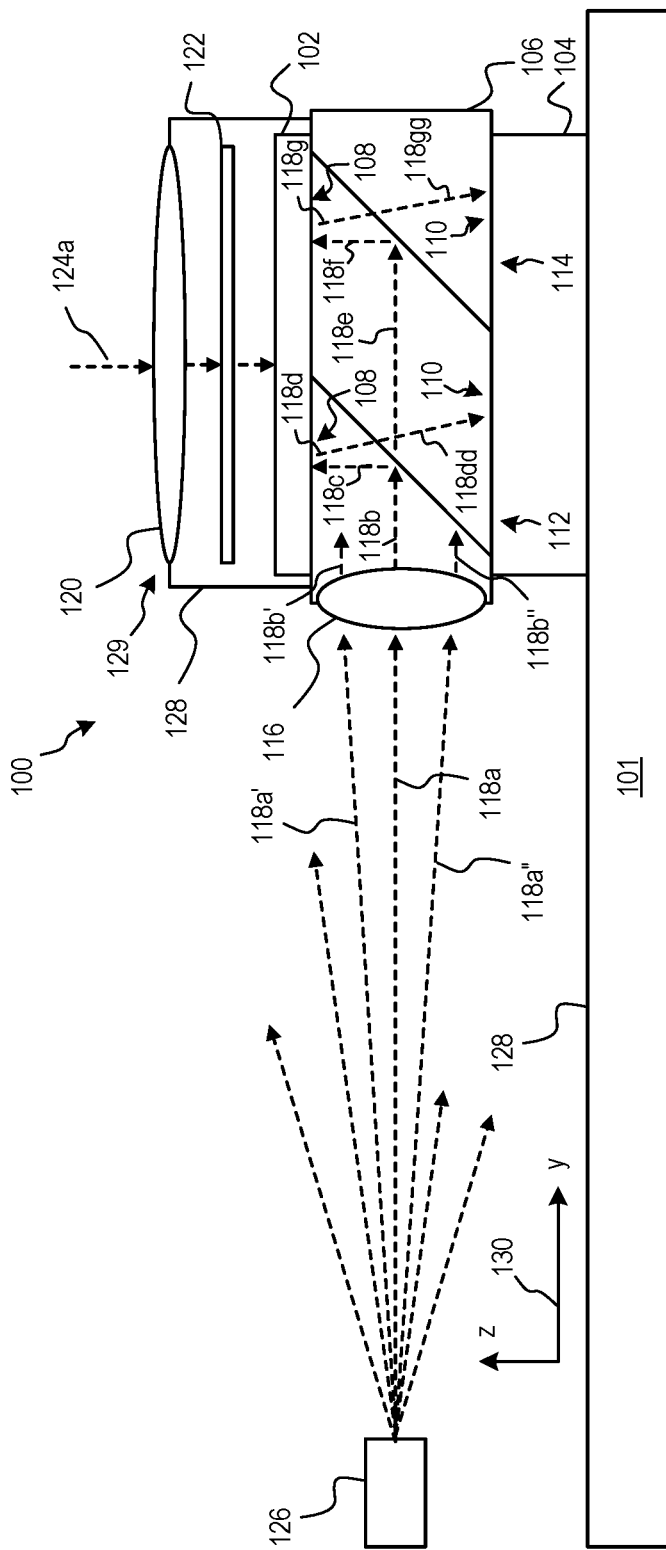
FIG. 1 illustrates an apparatus 100 configured to measure a distribution of electromagnetic radiation according to at least one embodiment.

FIG. 1 illustrates an electromagnetic radiation sensing apparatus 100 configured to measure a distribution of electromagnetic radiation (such as infrared radiation) according to at least one embodiment. In FIG. 1, the apparatus 100 is configured on a printed circuit board (PCB) 101 (such as a PCB of a mobile device or a separate PCB for a stand-alone radiation monitoring/imaging device). The apparatus 100 includes a micro-mirror chip 102, an image sensor 104, and a beamsplitter unit 106 located between the micro-mirror chip 102 and the image sensor 104. The micro-mirror chip 102 includes a plurality of light reflecting surfaces 108 that are illustrated in detail in FIGS. 2-4. The image sensor 104 includes an imaging surface 110. The beamsplitter unit 106 includes beamsplitters 112 and 114 arranged in sequence. The beamsplitters 112 and 114 are aligned along a horizontal axis (i.e., the y-axis) that is parallel to the micro-mirror chip 102 and the imaging surface 110. As shown, the beamsplitters 112 and 114 can be located side by side. The horizontal axis (i.e., the y-axis) is perpendicular to the vertical axis (i.e., the z-axis) and an axis going into and out of the plane illustrated in FIGS. 1-6 (i.e., the x-axis). The x-axis is not shown in FIGS. 1-6.

As shown, there is a layer of beamsplitters between the micro-mirror chip 102 and the image sensor 104. The cross section of each of the shown plurality of beamsplitters 112 and 114 in the plane illustrated in FIG. 1. Further, each beamsplitter includes a partially-reflective surface that is oblique to the imaging surface and the micro-mirror chip and that can extend across more than half the height of the beamsplitter. As shown, each partially-reflective surface extends across the height of the beamsplitter.

As illustrated, the micro-mirror chip 102 can be mounted directly onto the beamsplitter unit 106 and the beamsplitter unit 106 can be mounted directly onto the image sensor 104. The mounting can be performed by gluing the elements together with optical grade adhesive.

The micro-mirror chip 102 can include a set of micro mirrors formed on a substrate. Each mirror can be a plate having bi-material legs standing on a frame of the substrate. The reflective surface of each mirror plate can be part of a metal layer to form the plurality of light reflecting surfaces 108. The substrate layer of the mirror plate absorbs radiation (such as infrared radiation) to raise the temperate of the plate. The radiation absorption surface can be on the opposite side of the plate from the reflective surface. The bi-material legs bend according to the plate template to rotate the plate and hence the reflective surface. The rotation angle of the plate represents the temperature and/or the intensity of the absorbed radiation by the plate. Some additional aspects of some embodiments of the micro-mirror chip 102 are disclosed in U.S. Pat. No. 9,810,581.

The image sensor 104 can be a CMOS (or CCD) based image sensor. The image sensor 104 can be connected to or include an integrated signal processor such as an integrated ASIC. In some embodiments, a signal processor can be connected via the PCB 101 (e.g., see signal processing unit 602 of FIG. 6).

As illustrated in FIG. 1, a lens 116 (such as a lens having a spherical or an aspherical surface, or in some embodiments a flat surface) can be integrated with the beamsplitter unit 106. In some embodiments, the lens 116 can be integrated by cutting the right-side half of the lens 116 off to have a flat surface to attach the lens to the flat surface of the beamsplitter unit 106. In some other embodiments, the lens 116 is formed directly on the beamsplitter unit 106.

The apparatus 100 can have a point light source 126 located at a focal point of a lens 116. The lens 116 is shown configured to convert the non-collimated light rays, such as light rays 118a, 118a', and 118a" from the light source 126, into collimated light rays 118b, 118b', and 118b" entering the beamsplitter unit 106. Specifically, the lens 116 collimates and produces light rays 118b, 118b', and 118b" that are parallel to the imaging surface 110 and the micro-mirror chip 102. In some embodiments (not shown here) the light rays 118b, 118b', and 118b" can also converge towards each other to project a smaller image of the mirror plane onto the image plane. For instance, lens 116 collimates non-collimated light rays 118a, 118a', and 118a" into collimated light rays 118b, 118b', and 118b" respectively. The non-collimated light rays 118a, 118a', and 118a" emitted from a light source 126, form a cone shape with the tip of the cone at the light source 126. When the light source 126 is positioned at a focal point of the lens 116, the lens 116 converts the non-collimated light rays 118a, 118a', and 118a" into the collimated light rays 118b, 118b', and 118b" that are parallel light rays entering the beamsplitter 112.

The light source 126 can be implemented using a light emitting diode (LED).

As illustrated in FIG. 1, the beamsplitting unit 106 can have a front beamsplitter 112 and a back beamsplitter 114. The front beamsplitter 112 splits the incoming collimated light rays (e.g., 118b) into light rays reflected towards the portion of micro-mirror chip (102) above the front beamsplitter 112 and passing through light rays entering the back beamsplitter 114. The back beamsplitter 114 further splits the passing through light rays coming from the front beamsplitter 112 into light rays reflected towards the portion of micro-mirror chip (102) above the back beamsplitter 114 and light rays passing through the back beamsplitter 114.

For example, the beamsplitter 112 splits the collimated light ray 118b into two light rays 118c and 118e. The light ray 118c is reflected by the beamsplitter 112 towards the portion of the plurality of light reflecting surfaces 108 of the micro-mirror chip 102 that is positioned right above the beamsplitter, and the light ray 118e penetrates through the partially-reflective surface of the beamsplitter 112 as the incoming light ray for the beamsplitter 114. The light ray 118c is shown reflecting off one of the reflecting surfaces of the plurality of light reflecting surfaces 108 as light ray 118d, as illustrated in detail in FIGS. 2-4. The light ray 118d has a portion that passes through the partially-reflective surface of beamsplitter 112 towards the imaging surface 114 of the image sensor 104 as light ray 118dd.

The light ray 118e, passing through the beamsplitter 112, is reflected off partially the partially-reflective surface of the beamsplitter 114 as light ray 118f. The light ray 118f is shown as reflected by the beamsplitter 114 towards the portion of plurality of light reflecting surfaces 108 of the micro-mirror chip 102 that is right above the beamsplitter 114. The light ray 118f is shown being reflected off one of the reflecting surfaces of the plurality of light reflecting surfaces 108 as light ray 118g. The light ray 118g has a portion penetrating through the partially-reflective surface of beamsplitter 114 towards the imaging surface of the image sensor 104 as light ray 118gg.

As illustrated in FIG. 1, a radiation lens 120 can be used to direct environmental radiation rays 124a, through a radiation filter 122 (the radiation filter being optional), towards to the radiation absorption surfaces of the micro mirrors of the micro-mirror chip 102.

Figure 2:
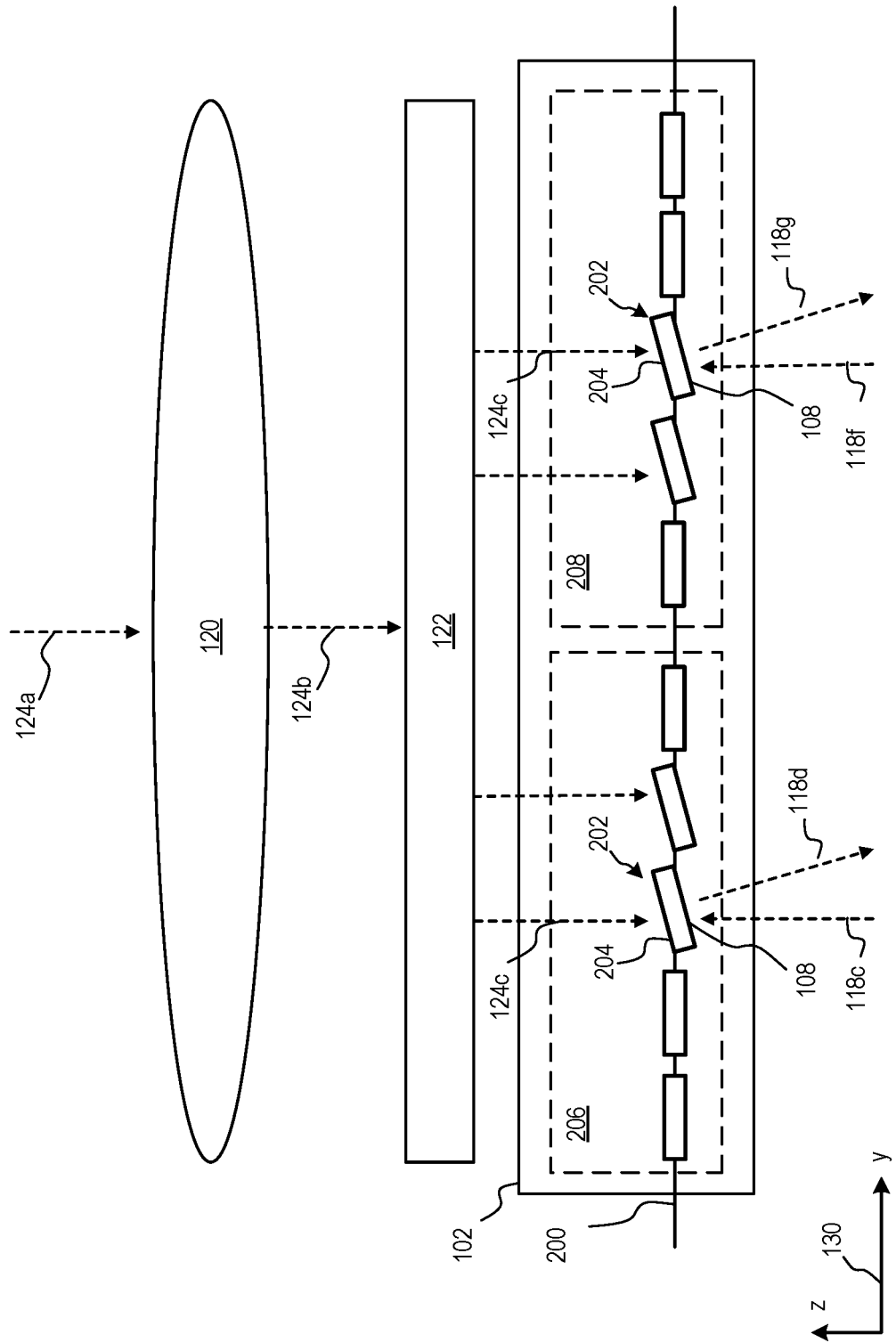
FIG. 2 illustrates some parts of the apparatus illustrated in FIG. 1, and further illustrates the micro-mirror chip of the apparatus.

FIG. 2 illustrates some parts of the apparatus 100 illustrated in FIG. 1, and further illustrates the micro-mirror chip 102 of the apparatus 100.

As shown in FIG. 2, the radiation filter 122 (which can be omitted in some embodiments) can filter the directed radiation before the radiation to be measured reaches the micro-mirror chip 102. Specifically, as shown, the radiation filter 122 can filter the directed radiation before the radiation is received by radiation absorption surfaces 204 of the micro mirrors 202.

The micro mirrors 202 can be arranged into two halves 206 and 208 of the micro-mirrors chip 102, as shown. Reflective surfaces of the micro-mirrors provide the plurality of light reflecting surfaces 108. Also, as shown, the plurality of light reflecting surfaces 108 are on respective opposing sides to respective radiation absorption surfaces 204.

In general, light emitted from a light emitting source (such as the light source 126, which can be or include a light emitting diode) is eventually reflected off the plurality of light reflecting surfaces 108 of the micro-mirror chip 102 according to the orientations of the plurality of light reflecting surfaces 108. And, the orientations result from the respective amounts of radiation received by each of the radiation absorption surfaces 204 of the micro-mirror chip 102. The orientations of the light reflecting surfaces 108 effect the angles 320 and 326 depicted in FIG. 3. FIG. 2 illustrates the radiation rays 124c causing certain micro mirrors 202 to change in orientation, and thus effecting the angle in which light rays 118c and 118f reflect off each of the respective surfaces of the plurality of light reflecting surfaces 108 as respective reflected light rays 118d and 118g.

As shown in FIG. 1, the lens 120 can be integrated with a housing 128 of the radiation filter 122 and the micro-mirror chip 102. Also, FIG. 1 shows the housing 128 having a recess and opening 129 in which the lens 120 can be integrated with the housing 128. The lens 120 is shown in FIGS. 1 and 2 as configured to direct rays of radiation, such as radiation rays 124a, to the radiation filter 122 as radiation rays 124b (as shown in FIG. 2).

The radiation filter 122 can have different filtering characteristics. For example, the radiation imaging lens 120 can be an infrared lens made of e.g., Germanium, Silicon, polymer, chalcogenide, glass, and the like.

As shown in FIG. 2, the radiation imaging lens is arranged in relation with micro mirrors 202 of the micro-mirror chip 102 to form an image of the radiation (e.g., infrared radiation) on a mirror plane 200 of the micro mirrors 202. The radiation image is derived from radiation rays 124c.

Figure 4:
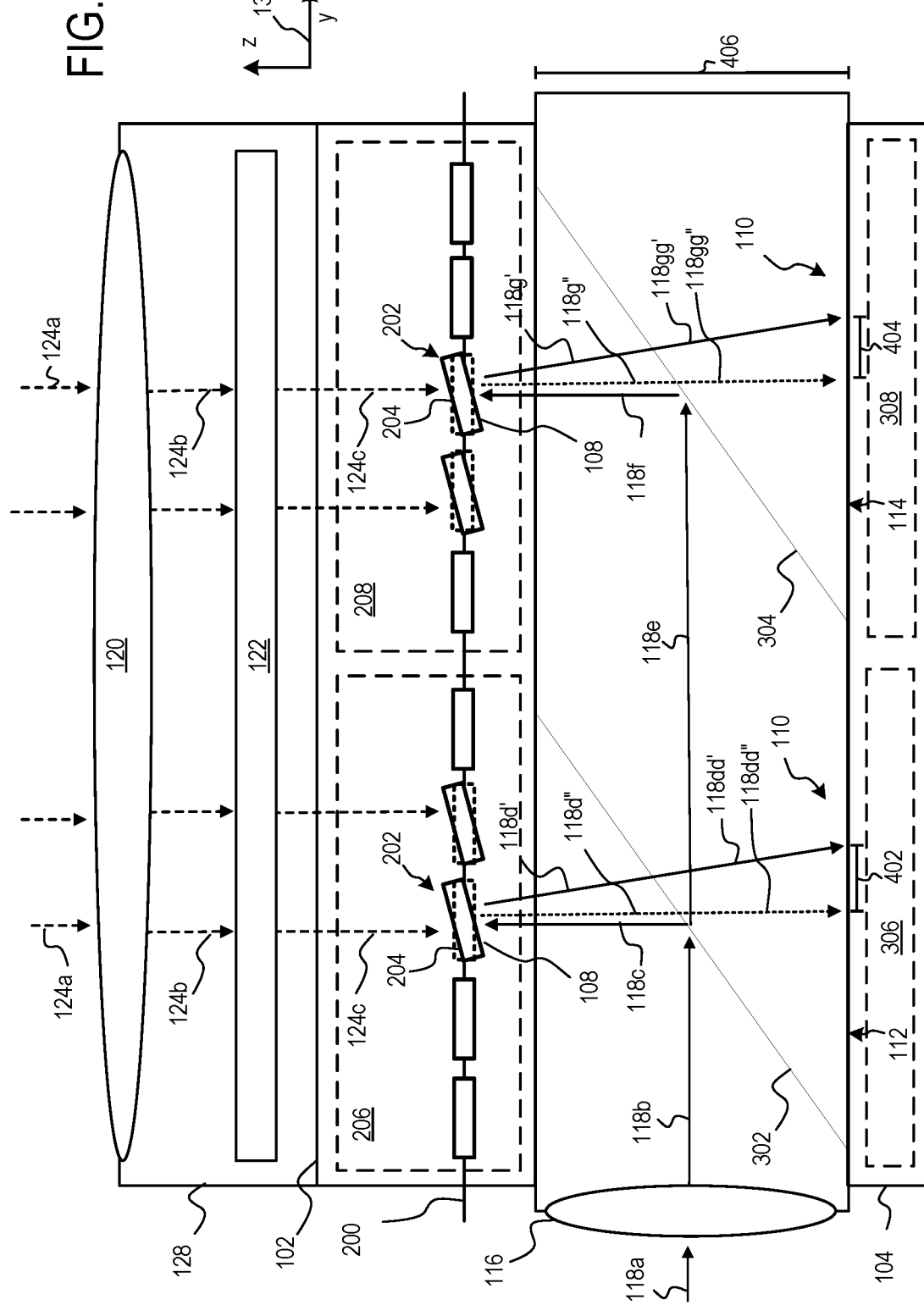
FIG. 4 illustrates some parts of the apparatus illustrated in FIG. 1, and further illustrates mechanisms for displacements of reflected light rays on the imaging surface of the apparatus to determine the intensity of electromagnetic radiation on micro mirrors of the apparatus.

The radiation intensity provided by radiation rays 124c can correspond to light ray displacement on the imaging surface 110 of the image sensor 104 (such as light ray displacements 402 and 404 as shown in FIG. 4). Light ray displacement, produced by a respective micro mirror of the micro mirrors 202, corresponds to the intensity of a pixel of the radiation image derived from the radiation filter 122 at the location of the respective micro mirror.

As shown in FIG. 1, the plurality of light reflecting surfaces 108 faces the imaging surface 110, and as illustrated in FIG. 2, each light reflecting surface of the plurality of light reflecting surfaces 108 functions as a micro mirror that moves independent of the other mirrors of the plurality of light reflecting surfaces 108 according to radiation absorbed by the radiation absorption surfaces 204.

Figure 3:
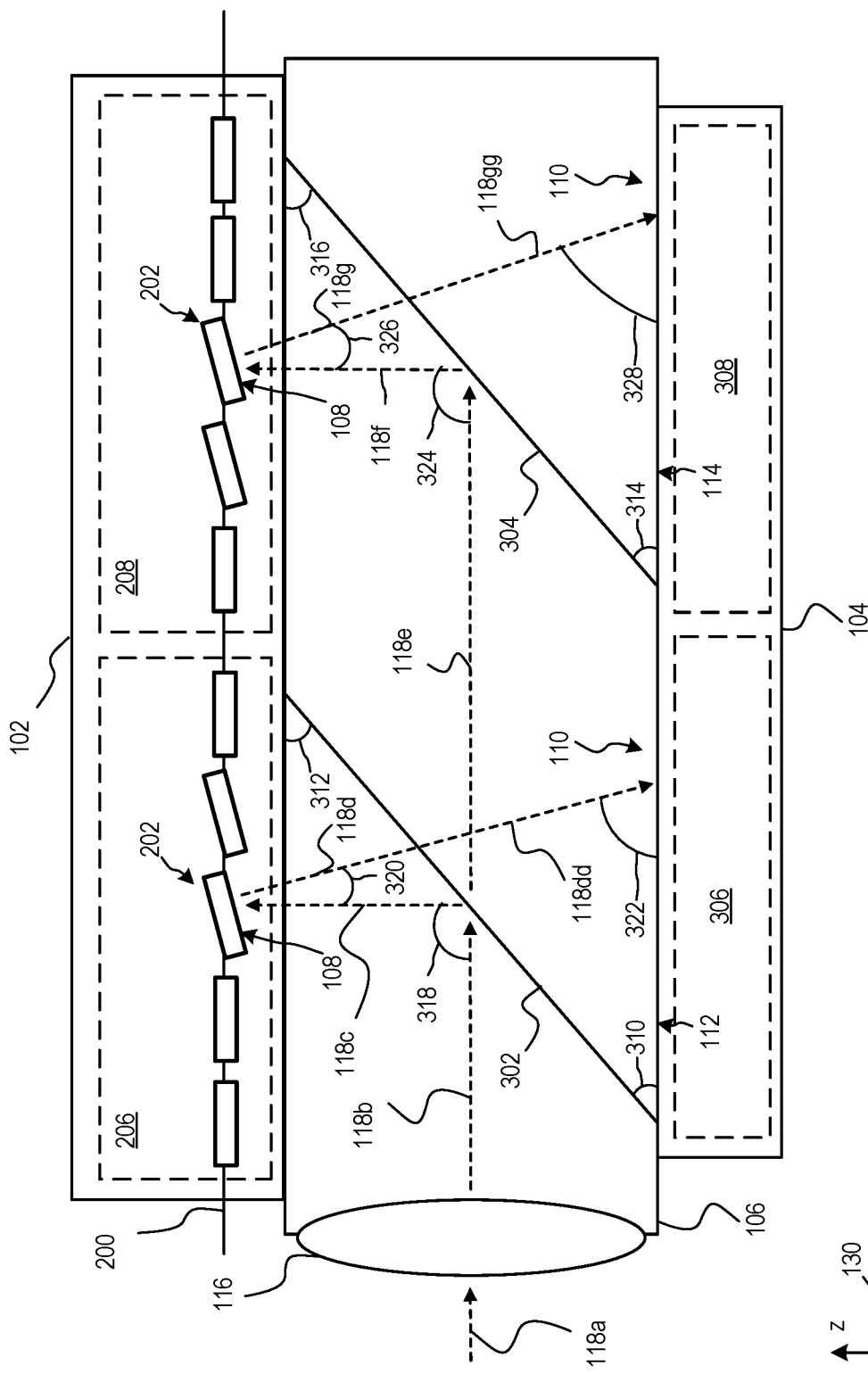
FIG. 3 illustrates some parts of the apparatus illustrated in FIG. 1, and further illustrates the beamsplitter unit of the apparatus.

FIG. 3 illustrates some parts of the apparatus 100 illustrated in FIG. 1, and further illustrates the beamsplitter unit 106 of the apparatus.

As illustrated in FIGS. 1 and 3, the beamsplitters 112 and 114 are arranged in sequence in a direction 130 that is parallel to the micro-mirror chip 102 and the imaging surface 110. For example, the beamsplitters 112 and 114 are positioned side by side along a horizontal axis (i.e., the y-axis) that is parallel to the micro-mirror chip and the imaging surface. Note that the direction 130 is also shown in FIGS. 1-6 as a direction of reference for the other aspects of and related to the apparatus 100.

As shown in FIG. 3, the beamsplitter unit 106 includes beamsplitter 112 including a first partially-reflective surface 302 that is oblique to the imaging surface 110 and the micro-mirror chip 102. The beamsplitter unit 106 also includes the beamsplitter 114 including a second partially-reflective surface 304 that is oblique to the imaging surface 110 and the micro-mirror chip 102. As shown, the first and second reflective surfaces 302 and 304 are aligned in sequence along a horizontal axis (i.e., the y-axis) that is parallel to the micro-mirror chip and the imaging surface. For example, the reflective surfaces 302 and 304 are positioned side by side along a horizontal axis that is parallel to the micro-mirror chip and the imaging surface, such that the second partially-reflective surface 304 is configured to further split a portion of the incoming light rays 118b that pass through the first partially-reflective surface 302 and a portion of the incoming light rays 118b is reflected towards the first half 206 of the micro-mirrors and a portion of the incoming light rays 118b that penetrates the first partially-reflective surface 302 is separately reflected towards the second half 208 of the micro-mirrors. Each of the reflective surfaces 302 and 304 can extend across more than half the height of its respective beamsplitter. As shown, the reflective surface 302 extends across the height of the beamsplitter 112 and the reflective surface 304 extends across the height of the beamsplitter 114.

Each of the first and second reflective surfaces 302 and 304 can be coated with a material that causes exactly 50:50 splitting of light rays at the surfaces.

In order to achieve a uniform illumination on the image plane, the first partially-reflective surface 302 needs to be coated with an optical film which has 25% reflection and 75% transmission. The second partially-reflective surface 304 needs to be coated with an optical film which has 50% reflection and 50% transmission. Assuming 100% of light intensity enters the beamsplitter unit 106 (e.g. as light ray 118b), at the surface 302 the reflected ray 118c will be of 25% intensity, which reflects back from the micro-mirror 108 (assuming theoretically no reflection loss). Thus, beam 118d has 25% of original intensity. Passing again through surface 302 the transmitted ray 118dd will have only 75% of its 25% relative intensity, meaning the final intensity of ray 118dd as falling onto the surface 110 is 18.75% of the original ray. Further continuing with light ray 118e which has been transmitted through surface 302 and which carries 75% of original intensity now transmits onto the second partially-reflective surface 304 and a relative 50% gets reflected upwards towards the micro mirrors, being defined as light ray 118f. Light ray 118f carries 37.5% absolute intensity and gets reflected off the micro-mirrors, turns into light ray 118g and passes through surface 304. At this point, it is losing another 50% of its intensity. Thus, light ray 118gg, as transmitted onto the imaging surface 110 has an intensity of 18.75%. Thus, the rays captured by the image plane appear in same or similar intensities with such a configuration.

Also, as shown in FIG. 3, the image sensor includes a first half 306 and a second half 308.

As illustrated in FIG. 3, the first partially-reflective surface 302 is oblique to the imaging surface 110 at an angle 310. The first partially-reflective surface 302 is oblique to the micro-mirror chip 102 at an angle 312. The second partially-reflective surface 304 is oblique to the imaging surface 110 at an angle 314. The semi-second reflective surface 304 is oblique to the micro-mirror chip 102 at an angle 316.

As described in detail herein, in some embodiments, the angles 310, 312, 314, and 316 are 45-degree angles. In some embodiments, when the micro-mirror chip 102 and the imaging surface 110 are not parallel to each other, the angles 310 and 314 can be different from the angles 312 and 316 (not shown in the drawings). Also, in some embodiments, the angles 310, 312, 314, and 316 can be the same but are less than or greater than 45-degree angles.

As shown in FIG. 3, the beamsplitter 112 is configured to split a light ray 118b to a light ray 118c and a light ray 118e. As shown, the light ray 118c reflects from the beamsplitter 112 at the first partially-reflective surface 302 at an angle 318 towards first half 206 of the micro-mirror chip 102. The light ray 118e passes through the beamsplitter 112 towards the beamsplitter 114. Each light reflecting surface of the plurality of light reflecting surfaces 108 of the first half 206 of the micro-mirror chip 102 reflects a light ray 118d, at an angle 320, which is split at the first reflective surface 302 to a light ray 118dd and another light ray (not shown in the drawings) where the light ray 118dd passes through the first partially-reflective surface 302 to reach the imaging surface 110 at the first half 306 of the image sensor 104, at an angle 322.

Also, as shown in FIG. 3, the light ray 118e passes through the beamsplitter 112 and is split by the beamsplitter 114 into a light ray 118f and another light ray (not shown in the drawings), where the light ray 118f is reflected by the beamsplitter 114 at a second partially-reflective surface 304 at an angle 324 towards second half 208 of the micro-mirror chip 102 and the other light ray passes through the beamsplitter 114. Each light reflecting surface of the plurality of light reflecting surfaces 108 of the second half 208 of the micro-mirror chip 102 reflects a light ray 118g, at a respective angle 326 indicative of its exposure to radiation 124c. The reflected light ray 119g is split at the second reflective surface 304 to a light ray 118gg and another light ray (not shown in the drawings) where the light ray 118gg passes through the second reflective surface 304 to the imaging surface 110 at the second half 308 of the image sensor 104, at an angle 328.

In some embodiments, the beamsplitter unit includes a first beamsplitter having a first 45-degree partially-reflective surface that is 45 degrees from the imaging surface and 45 degrees from the micro-mirror chip. The first 45-degree partially-reflective surface can extend across more than half the height of the first beamsplitter (e.g., the first 45-degree partially-reflective surface can extend across the entire height of the first beamsplitter). Also, in such embodiments, the beamsplitter unit can include a second beamsplitter including a second 45-degree partially-reflective surface that is 45 degrees from the imaging surface and 45 degrees from the micro-mirror chip. The second 45-degree partially-reflective surface can extend across more than half the height of the second beamsplitter (e.g., the second 45-degree partially-reflective surface can extend across the entire height of the second beamsplitter).

As mentioned herein, each of angles 310, 312, 314, and 316 can be 45 degrees. This can occur when the beamsplitters are align in sequence and parallel to the micro-mirror chip and the imaging surface of the image sensor. For example, this can occur when the beamsplitters are aligned side by side along a horizontal axis that is parallel to the micro-mirror chip and the imaging surface of the image sensor. Although it appears in FIG. 3 that all the angles 310, 312, 314, and 316 are approximately 45 degrees, for the present disclosure it shall be understood that the aforesaid angles can vary.

In such embodiments with the beamsplitters having 45-degree reflective surfaces and the beamsplitters being aligned in sequence and parallel to the micro-mirror chip and the imaging surface, the angle 318 is a 90-degree angle with respect to the direction 130 (the direction 130 being parallel to the micro-mirror chip 102 and the imaging surface 110). To put it another way, in such embodiments, the angle 318 is a 90-degree angle with respect to the micro-mirror chip 102 and the imaging surface 110. In such embodiments, when a light reflecting surface of the plurality of light reflecting surfaces 108 that reflects the light ray 118c is aligned parallel to the direction 130, the angle 320 is a zero-degree angle in that the light ray 118d is reflected directly back along the path of the light ray 118c. Also, in such embodiments, when the light reflecting surface that reflects the light ray 118c as ray 118d is aligned parallel to the direction 130, the angle 322 is a 90-degree angle with respect to the direction 130.

Likewise, in such embodiments with the beamsplitters including 45-degree reflective surfaces and being aligned in sequence and parallel to the micro-mirror chip and the imaging surface, the angle 324 is a 90-degree angle with respect to the direction 130 (the direction 130 being parallel to the micro-mirror chip 102 and the imaging surface 110). To put it another way, in such embodiments, the angle 324 is a 90-degree angle with respect to the micro-mirror chip 102 and the imaging surface 110. In such embodiments, when a light reflecting surface of the plurality of light reflecting surfaces 108 that reflects the light ray 118f is parallel to the direction 130, the angle 326 is a zero-degree angle in that the light ray 118g is reflected directly back along the path of the light ray 118f. Also, in such embodiments, when the light reflecting surface that reflects the light ray 118f is parallel to the direction 130, the angle 328 is a 90-degree angle with respect to the direction 130.

Also, in such embodiments with the beamsplitters including 45-degree reflective surfaces and being aligned in sequence and parallel to the micro-mirror chip and the imaging surface, a light ray of 100% intensity (e.g., the light ray 118b) can be split by a first beamsplitter (e.g., the beamsplitter 112) to two light rays each of 50% intensity (e.g., the light rays 118c and 118e). One of the two split light rays of 50% intensity can reflect from the first beamsplitter towards a first half (e.g., first half 206) of the micro-mirror chip and the other split light ray of 50% intensity passes through the first beamsplitter towards the second beamsplitter (e.g., the beamsplitter 114).

Also, in such embodiments with the beamsplitters including 45-degree reflective surfaces and being aligned in sequence and parallel to the micro-mirror chip and the imaging surface, each light reflecting surface of plurality of light reflecting surfaces (e.g., the plurality of light reflecting surfaces 108) of the first half of the micro-mirror chip reflects a light ray (e.g., light ray 118d) that is split at a first 45-degree reflective surface (e.g., the first reflective surface 302) such that the split ray passes through the first 45-degree reflective surface to a first half (e.g., first half 306) of the imaging surface at 25% intensity (e.g., light ray 118dd can have an intensity of 25% in such embodiments). The light ray reflecting off the first reflective surface of the first beamsplitter at this point is not shown in the drawings.

Also, in such embodiments with the beamsplitters including 45-degree reflective surfaces and being aligned in sequence and parallel to the micro-mirror chip and the imaging surface, the split light ray passing through the first beamsplitter of 50% intensity (e.g., light ray 118e) is split by the second beamsplitter to two light rays each of 25% intensity. The light ray passing through the second beamsplitter at this point is not shown in the drawings. One of the two split light rays of 25% intensity (e.g., light ray 118f) reflects from the second beamsplitter towards a second half (e.g., second half 208) of the micro-mirror chip, and the other split light ray of 25% intensity (not shown in the drawings) passes through the second beamsplitter.

Also, in such embodiments with the beamsplitters including 45-degree reflective surfaces and being aligned in sequence and parallel to the micro-mirror chip and the imaging surface, each light reflecting surface of plurality of light reflecting surfaces of the second half of the micro-mirror chip reflects a light ray (e.g., light ray 118g) that is split at a second 45-degree reflective surface (e.g., second reflective surface 304) such that the split ray passes through the second 45-degree reflective surface to a second half (e.g., second half 308) of the imaging surface at 12.5% intensity (e.g., light ray 118gg can have an intensity of 12.5% in such embodiments). The light ray reflecting off the second reflective surface of the second beamsplitter at this point is not shown in the drawings.

FIG. 4 illustrates some parts of the apparatus 100 illustrated in FIG. 1, and further illustrates mechanisms for displacements (such as displacements 402 and 404) of reflected light rays on the imaging surface 110 of the image sensor 104 of the apparatus 100 to determine the intensity of electromagnetic radiation at corresponding locations of micro mirrors 202 of the micro-mirror chip 102 of the apparatus 100. FIG. 4 also shows the micro-mirror chip 102 in the same level of detail as FIG. 2, and depicts the integration of the micro-mirror chip 102 with the beamsplitter unit 106 and the image sensor 104.

Regarding the mechanisms for displacements, FIG. 4 shows dotted arrows 118d", 118dd", 118g", and 118gg" that represent the positions of the corresponding light rays reflected by respective micro mirrors 202 in an initial dotted line position of the respective micro mirrors 202. After the micro mirrors 202 rotate from the dotted line position to the solid line position (as a consequence of absorbing or sensing sufficient radiation to rotate the mirrors), the light rays of the rotated micro mirrors 202 move from the initial location to a subsequent location as illustrated by the solid arrows 118d', 118dd', 118g', and 118gg'.

The measurements of the light ray displacements 402 and 404 can be used to compute an angle of rotation of the corresponding micro mirrors 202. The rotation of a respective one of micro mirrors 202 is proportionately a function of the radiation intensity on the respective one of the radiation absorption surfaces 204 of a respective micro mirror; thus, the measured displacements 402 and 404 can be used to calculate the radiation intensity on the radiation absorption surfaces 204 of the micro mirrors 202.

The measurement of the light ray displacement (e.g., displacements 402 or 404) can be performed for each one of micro mirrors 202 and used to determine the distribution of the radiation intensity on a single micro mirror or on an array of the micro mirrors.

In one embodiment, a photodetector is used to capture the image formed on the imaging surface 110 of the image sensor 104, identify individual light spots derived from corresponding light rays and corresponding to respective micro mirrors 202, determine the locations of the light spots, and compute displacements of the respective light spots corresponding to the displacements of the light rays (such as displacements 402 and 404); and thus, compute the light intensity associated with the radiation intensity on the micro mirrors 202.

As shown in FIGS. 2 and 4, the y-axis is in the direction of the row of micro mirrors 202 and is parallel to the imaging surface 110 as well as the direction 130 described herein. The light ray displacements 402 and 404, and hence the corresponding light spot displacements on the imaging surface 110, are along the y-axis direction. The mirror plane 200 and the imaging surface 110 are separated by a distance 406 along the z-axis that is perpendicular to the mirror plane 200 and the y-axis direction. As illustrated, the height of the beamsplitter unit 106 can be the distance 406.

The distance 406 along the direction perpendicular of the row of mirrors (i.e., the z-axis) can include the beamsplitter unit 106 (as shown in FIGS. 1-6). Thus, to prevent the beamsplitter unit 106 from interfering with the reflected light from the micro-mirror chip, in some embodiments, the reflected light can travel in a path that avoids the beamsplitter unit 106.

Not shown in the drawings, in some embodiments, light rays can be reflected from one of the plurality of light reflecting surfaces 108 at an angle from the mirror plane 200 in a direction along the x-axis in the x-z plane. The x-z plane is perpendicular to the y-z plane of FIGS. 1-6. Thus, in such embodiments, light rays generally travel along the direction of the row of micro mirrors (such as shown by micro mirrors 202) onto the mirror plane 200 in the y-z plane; and, after being reflected by the micro mirrors, the rays travel along the same direction onto the imaging surface of the image sensor but skewed in the x-z plane or in the direction of the x-axis which goes into or out of the y-z plane of FIGS. 1-6. In one embodiment, there are no structural and/or optical components on the light path between the micro mirrors and the imaging surface. In these ways for example, the reflected light can travel in a path that avoids the beamsplitter unit 106 when traveling towards the imaging surface 110.

As shown in FIG. 4, the imaging surface 110 is in parallel with the mirror plane 200. Thus, when the micro mirrors 202 are in the initial positions that are aligned with the mirror plane 200, the light reflected by different micro mirrors 202 travels equal distances from respective light reflecting areas of the plurality of light reflecting surfaces 108 of the micro mirrors to the imaging surface 110. As a result, equal rotations of the micro mirrors 202, due to equal radiation intensity applied on the radiation absorption surfaces 204 of the micro mirrors 202, result in equal light ray displacement on the imaging surface 110. This arrangement can simplify the calibration for computing the light intensity from the light ray displacement and/or improve accuracy and/or ensure uniform signal generation and uniform sensitivity in the conversion from radiation intensity to light ray displacement.

FIG. 4 illustrates the measuring of displacements (e.g., displacements 402 and 404) of reflected light rays on the imaging surface 110 to determine the intensity of electromagnetic radiation at the location of micro mirrors according to one embodiment.

FIGS. 2 and 4 illustrate a single row of mirrors. However, the micro-mirror chip 102 can have multiple rows of mirrors, which cannot be shown by the two dimensions of FIGS. 1-6.

Not shown in the drawings, in some embodiments, each one of the micro mirrors 202 on its respective light reflecting surface of the plurality of light reflecting surfaces 108 has a light reflecting area and a non-reflective area. The shape and size of the light reflecting area of each micro mirror defines a light spot reflected by the micro mirror on to the imaging surface. In some embodiments, micro mirrors of a chip have the same shape and size in their light reflecting areas. Alternatively, different micro mirrors in a chip can have different shapes and/or sizes in their light reflecting areas, resulting in differently shaped reflected light spots on the imaging surfaces.

The different optical characteristics of the light reflecting areas can be used to improve the accuracy in correlating the light spots on the imaging surface with the corresponding micro mirrors responsible for reflecting the light spots. Different optical characteristics can be achieved by using varying the shape, size, reflection rate, orientation, and/or polarization, etc. of in the reflecting surfaces of the plurality of light reflecting surfaces 108. Further, symbols or graphical patterns can be applied (e.g., etched or overlaid) on the light reflecting areas to mark the micro mirrors such that the micro mirrors responsible for generating the light spots on the imaging surface can be identified from the shape, size, orientation, polarization, intensity and/or markers of the corresponding light spots captured on the imaging surface.

Figure 5:
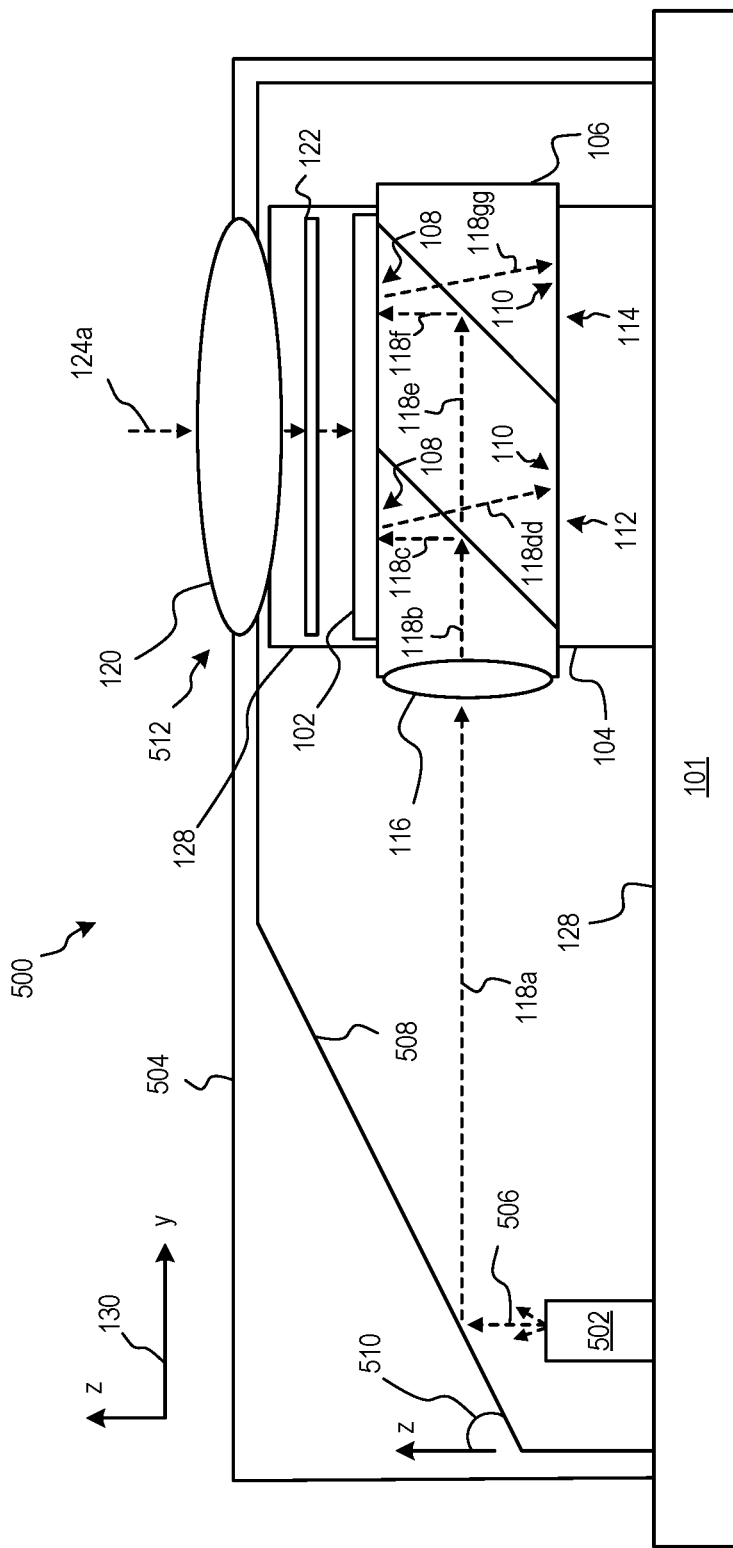
FIG. 5 illustrates another apparatus 500 configured to measure a distribution of electromagnetic radiation according to at least one other embodiment where the light source is part of the printed circuit board.

FIG. 5 illustrates another apparatus 500 configured to measure a distribution of electromagnetic radiation according to at least one other embodiment where a light source 502 for the apparatus 500 is part of the PCB 101.

As shown, the apparatus 500 includes or interacts with many elements that are similar to elements of or that interact with the apparatus 100 of FIG. 1. Different from apparatus 100, apparatus 500 includes a housing 504 and the light source 502 (which can be or include a light emitting diode) that is part of the PCB 101 and perpendicular to a large plane of the PCB.

The light source 502 emits light rays including light ray 506 upwards in the general direction of the z-axis. To reflect light towards the lens 116 integrated with the beamsplitter unit 106, the housing 504 includes an angled wall 508 that is skewed from the z-axis at angle 510. In some embodiments, the angle 510 is 45 degrees so that a center ray, e.g., light ray 506, of the light rays emitted by the light source 502, is reflected at a 90-degree angle towards the lens 116. At least a portion of the angled wall 508 is reflective and functions as a mirror such that a mirror image of the light source 502 is at a focal point of the lens 116. Thus, the lens 116 can convert the non-collimated light rays reflected by the wall 508 into collimated light rays 118b in a way as illustrated in FIG. 1. The reflective wall 508 allows the light source 502 to be configured on the PCB 101 and/or reduce the length of the apparatus 500 along the y-axis.

Also, as shown, the apparatus 500 includes a recess and opening 512 in which the lens 120 can be integrated with the housing 504. Also, similar to the apparatus 100 of FIG. 1, the lens 120 can be integrated with the housing 128 of the radiation filter 122 and the micro-mirror chip 102. Also, FIG. 5 shows the housing 128 having a recess and opening, which is similar to the recess and opening 129, in which the lens 120 can be integrated with the housing 128.

The additional features of apparatus 500 and some of their alternatives are further described in related Prov. U.S. Pat. App. Ser. No. 62/791,193 originally titled "ON-BOARD RADIATION SENSING APPARATUS". In the related application originally titled "ON-BOARD RADIATION SENSING APPARATUS", at least some embodiments disclosed relate to on-board electromagnetic radiation detection using beam splitting in general and more particularly but not limited to the on-board sensing of infrared (IR) radiation using beam splitting in a radiation sensing apparatus. The entire disclosure of the related application originally titled "ON-BOARD RADIATION SENSING APPARATUS" is hereby incorporated herein by reference.

Figure 6:
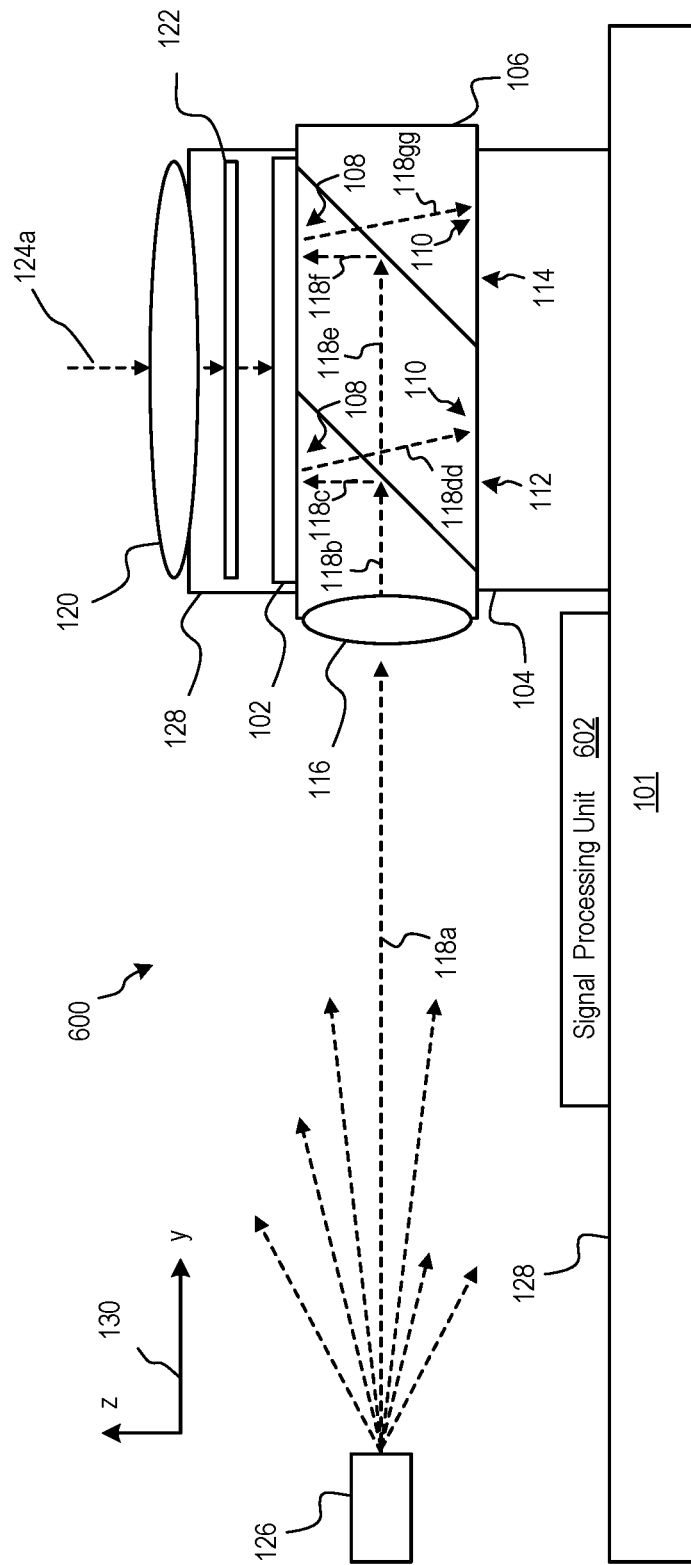
FIG. 6 illustrates another apparatus 600 configured to measure a distribution of electromagnetic radiation according to at least one other embodiment where a signal processing unit is integrated with or directly attached to the image sensor.

FIG. 6 illustrates another apparatus 600 configured to measure a distribution of electromagnetic radiation according to at least one other embodiment where a signal processing unit 602 is connected to the image sensor 104 via the PCB 101.

As shown, the apparatus 600 includes or interacts with many elements that are similar to elements of or that interact with the apparatus 100 of FIG. 1. Different from apparatus 100, apparatus 600 includes the signal processing unit 602. Alternatively, a signal processing unit can be indirectly connected to the image sensor 104, such as a remote signal processing unit connected to the image sensor through a computer network or through a connector. In other embodiments, a signal processing unit can be directly connected to the PCB 101, and in such examples a coupling on the PCB 101 can connect the image sensor 104 and the signal processing unit (as illustrated in FIG. 6).

In some embodiments, a signal transmitting unit is coupled with the signal processing unit 602 or its alternative to transmit the image data captured by the image sensor 104 and/or the measuring data processed by the signal processing unit 602 or its alternative. The image data captured by the image sensor 104 and/or the measuring data processed by the signal processing unit 602 or its alternative indicate the light ray displacements (such as displacements 402 and 404), the micro mirror rotations, and the intensity of the radiation (such as the intensity of radiation rays 124c).

The signal processing unit 602 can be programmed for customized processing of designated applications. The signal processing unit 602 can process the reflected light ray displacements (such as displacements 402 and 404) and generate corresponding electrical signal gains. The signal can be further processed and for example displayed to the end user via an external display. In one example, signals processed by the signal processing unit 602 are transmitted through a communication port wirelessly to a portable device, where the end user can see the generated signals and has the ability to control or interact through a user interface with the apparatus 600 or the signal processing unit 602. The signals can be transmitted and exchanged through any wired or wireless transmission method, using e.g. a USB, Bluetooth, Wi-Fi, etc. The end user's display and interface can include any device, for example a smartphone, tablet, laptop computer, etc.

Figure 7B:
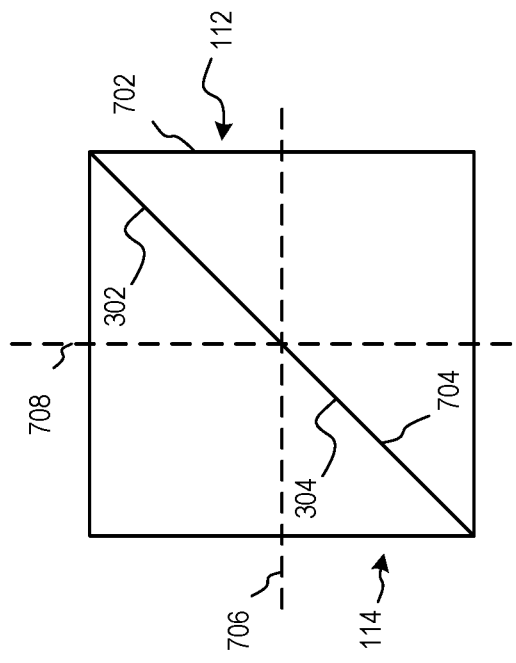
FIGS. 7A, 7B, and 7C illustrate a construction for the structure of a beamsplitter unit according to at least one embodiment.
Figure 7C:
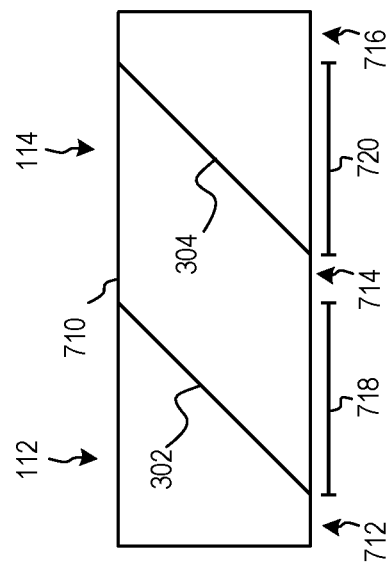
Figure 7A:
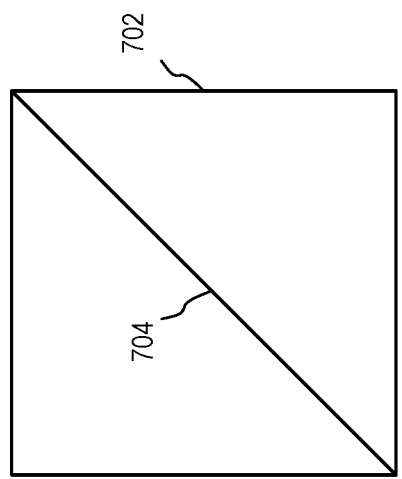

FIGS. 7A, 7B, and 7C illustrate a construction for the structure of a beamsplitter unit according to at least one embodiment (such as the beamsplitter unit 106 of FIGS. 1-6). A beneficial feature of the beamsplitter unit described herein is that its height is reduced so that the apparatus using the beamsplitter unit has a reduced height as well. This is especially useful for applications with mobile devices. The reduced height of the beamsplitter unit and the apparatus housing the beamsplitter unit can allow for including the beamsplitter unit and the apparatus in a mobile device. The mobile device can be any electronic device small enough to be held and operated by one or two hands of a person. For instance, the beamsplitter unit described herein can have a height of less than 4 millimeters, which allows for use of the beamsplitter unit within many different types of mobile devices.

The beamsplitter unit described herein is similar to a horizontal arrangement of half-sliced parts of one beamsplitter. To put it another way, the beamsplitter unit is similar to a device including half-sliced parts of one beamsplitter that have been rearranged so that the two half-sliced parts are merged sequentially in a horizontal manner.

FIG. 7A illustrates one beamsplitter 702. Beamsplitter 702 of FIG. 7A includes one reflective surface 704 (e.g., one 45-degree reflective surface). FIG. 7B shows slices 706 and 708 of the beamsplitter 702. The slices 706 and 708 divide the beamsplitter in to four parts. Two of the parts can include the beamsplitters 112 and 114. And, as shown in FIGS. 7B and 7C, the beamsplitters can include the reflective surfaces 302 and 304 of FIG. 3 respectively. FIG. 7C shows the merged beamsplitters 112 and 114, which are merged into structure 710. As shown, there is an area 712 in front of the beamsplitter 112, an area 714 between the beamsplitter 112 and the beamsplitter 114, and an area 716 behind the beamsplitter 114.

The respective lengths 718 and 720 of each of the beamsplitters 112 and 114 further clarify the boundaries of the areas 712, 714, and 716.

The structure 710 of FIG. 7C can be formed by initially cutting the beamsplitter 702 according to slices 706 and 708 of FIG. 7B, and then attaching the two parts of beamsplitter 702 that have the reflective surfaces 302 and 304. Also, the structure 710 of FIG. 7C can be formed by adding three blocks of transparent materials. The left-side block of the three blocks can include an integrated lens such as a lens similar to lens 116 of FIG. 1. The integrated lens is not shown in FIG. 7C. The three blocks can provide the areas 712, 714, and 716. Along with the left-side block (which can include an integrated lens), a second spacer block can be attached between the beamsplitters 112 and 114, and a third spacer block can be attached to the right of the beamsplitter 114 to derive the structure 710 of FIG. 7C.

It can be beneficial to include the spaces provided by areas 712, 714, and 716 in the beamsplitter unit. The spaces are beneficial in that they can reduce the effect inferring light rays that occur from the different light refractions that occur in the beamsplitter unit 106. Such inferring light rays interfere with the light rays used to detect radiation when there is not sufficient space between the reflecting surfaces of the beamsplitters 112 and 114. Thus, the areas 712, 714, and 716 can provide the sufficient space to reduce interference.

Another way to reduce interference is to increase the length of each beamsplitter of the beamsplitter unit 106. Since it is desirable to include the disclosed apparatuses in mobile devices, increasing the height of beamsplitters to reduce interference is not a practical option considering that many mobile devices have a thin form.

To reduce interference for apparatuses to be used within mobile devices, in some embodiments, the distance between the micro-mirror chip and the imaging sensor is equal to or less than either of the lengths of the imaging sensor and the micro-mirror chip. For example, the distance between the micro-mirror chip and the imaging sensor is half or less than half of the length of the imaging sensor. Also, the distance between the micro-mirror chip and the imaging sensor can be half or less than half of the length of the micro-mirror chip.

In some embodiments, the length of each beamsplitter of the beamsplitter unit 106 (such as each respective length 718 and 720 of beamsplitters 112 and 114) is at most half of the length of the imaging sensor or the micro-mirror chip used with the beamsplitter unit. In some embodiments including such embodiments where the length of each beamsplitter of the beamsplitter unit is at most half of the length of the imaging sensor or the micro-mirror chip used with the beamsplitter unit, the micro-mirror chip and the image sensor can be the same length.

Also, the length of the beamsplitter unit can be greater than, less than, or equal to the lengths of the imaging sensor and the micro-mirror chip. For example, the length of the image sensor and the total length of the beamsplitter unit can be the same or the beamsplitter unit can have a greater or lesser length than the image sensor. Also, the length of the micro-mirror chip and the total length of the beamsplitter unit can be the same or the beamsplitter unit can have a greater or lesser length than the micro-mirror chip.

In some embodiments, the sequence of beamsplitters can include more than two beamsplitters. For example, the sequence can have three or four or even more beam splitting planes.

Also, described herein is a printed circuit board arrangement with a flexible part for an electromagnetic radiation detector. In some embodiments, the electromagnetic radiation sensing using beam splitting in a radiation sensing apparatus includes the light source mounted on a flexible part (e.g., see the flexible part 802 depicted in FIG. 8). In other words, variations of the apparatuses described herein can include a light source mounted to a flexible part (e.g., see the flexible part 802 depicted in FIG. 8). In some embodiments, a light source, such as a light-emitting diode (LED), is attached to a flexible part of the radiation sensing apparatus or a flexible part of the PCB (printed circuit board) in which the apparatus is attached (e.g., see the flexible part 802 depicted in FIG. 8). By bending the flexible part, a beam emitted from the light source can be directed towards a beamsplitter (e.g., see FIG. 8).

With using the flexible part, the light ray from the light source (such as from an LED) can hit the beamsplitter perpendicularly. Also, the light source can be fixed to the PCB. In some embodiments, the light source can be fixed to a flexible part of the PCB or a flexible part of the apparatus that is attached to the PCB. Also, in some embodiments (not depicted), the apparatus can include a reflective wall (e.g., angled wall 508 depicted in FIG. 5) and a flexible part (e.g., see the flexible part 802 depicted in FIG. 8), such that the flexible part is flexed so that a beam is emitted towards the reflective surface from a light source mounted to the flexible part, and then reflected towards the beamsplitter from the reflective surface.

In some embodiments, the light source is attached to a flexible part of the PCB and the flexible part is bent upwards. In such example, the flexible part can be attached on a vertical side (front) wall of the housing of the apparatus. The wall can have a small opening (such as a pinhole) for the light source to emit beams through the opening.

Figure 8:
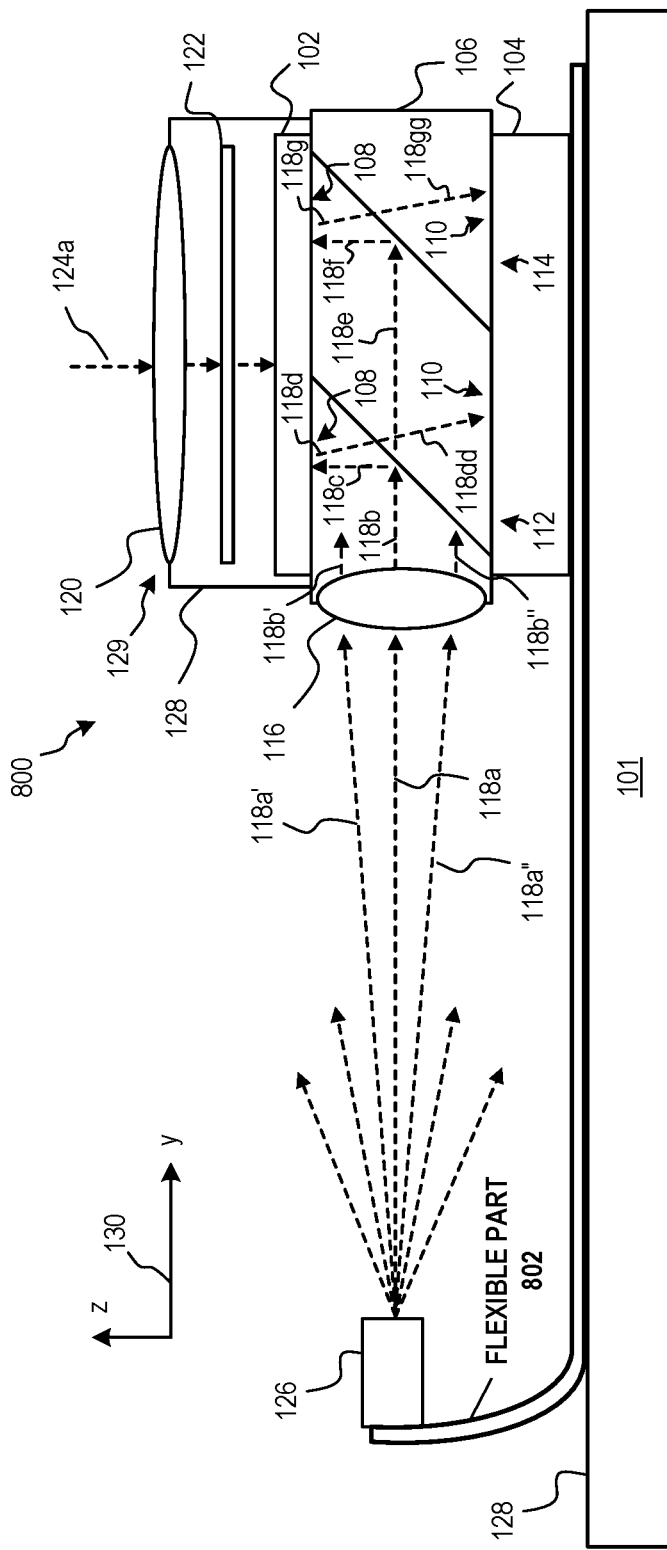
FIG. 8 illustrates another apparatus 800 configured to measure a distribution of electromagnetic radiation according to at least one other embodiment where the apparatus includes a light source mounted on a flexible part.

In some embodiments, the flexible part (flex PCB) is part of the PCB. A stiffener and a low-profile board-to-board connector can connect the flex PCB to a main PCB in the assembly. Also, a lens and the outer walls of the apparatus can include a molded plastic shell glued on the PCB. The lens can be the lens 120 as shown in FIG. 8.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus comprising:
a plurality of mirrors;
a sensor having a surface to receive light rays reflected from the mirrors; and
at least one beamsplitter located between the mirrors and the sensor, wherein the beamsplitter comprises at least one partially-reflective surface configured to partially reflect light rays towards the mirrors.

2. The apparatus of claim 1, wherein the at least one partially-reflective surface includes first and second partially-reflective surfaces aligned in sequence.

3. The apparatus of claim 2, wherein a first beamsplitter comprises the first partially-reflective surface, and a second beamsplitter comprises the second partially-reflective surface.

4. The apparatus of claim 3, wherein the first and second beamsplitters are positioned side by side.

5. The apparatus of claim 1, wherein each mirror comprises a light reflecting surface on one side of the mirror, and a radiation absorption surface on an opposing side of the mirror.

6. The apparatus of claim 1, wherein each mirror is configured to have an orientation determined by an amount of radiation received by a radiation absorption surface of the mirror.

7. The apparatus of claim 6, wherein light is reflected off a light reflecting surface of each mirror according to the respective orientation of the mirror.

8. The apparatus of claim 1, wherein the light rays reflected from the mirrors form an image on the surface of the sensor.

9. The apparatus of claim 8, wherein displacements of the light rays reflected from the mirrors on the surface of the sensor determine an intensity of radiation at corresponding locations of the mirrors.

10. The apparatus of claim 9, further comprising a signal processing unit configured to:
identify light spots derived from corresponding light rays and corresponding to respective mirrors;
determine locations of the light spots; and
compute displacements of the respective light spots corresponding to the displacements of the light rays.

11. The apparatus of claim 8, wherein the sensor is a photodetector configured to capture the image.

12. The apparatus of claim 8, further comprising a signal processing unit connected to the sensor, wherein the signal processing unit is configured to determine a distribution of radiation intensity based on displacements of the light rays reflected from the mirrors on the surface of the sensor.

13. An apparatus comprising:
a substrate;
a plurality of mirrors formed on the substrate, wherein each mirror comprises a light reflecting surface on one side of the mirror, and a radiation absorption surface on an opposing side of the mirror;
a sensor having a surface to receive light rays reflected from the mirrors;
a first beamsplitter comprising a first partially-reflective surface configured to partially reflect light rays towards the mirrors; and
a second beamsplitter comprising a second partially-reflective surface configured to partially reflect light rays towards the mirrors;
wherein the first and second beamsplitters are positioned between the substrate and the sensor.

14. The apparatus of claim 13, wherein the first and second partially-reflective surfaces are aligned in sequence.

15. The apparatus of claim 13, wherein each of the first and second partially-reflective surfaces is oblique to the surface of the sensor.

16. The apparatus of claim 13, wherein each mirror is configured to have an orientation determined by an amount of radiation received by the radiation absorption surface of the mirror.

17. The apparatus of claim 16, wherein light is reflected off the light reflecting surface of each mirror towards the surface of the sensor according to the respective orientation of the mirror.

18. An apparatus comprising:
a plurality of mirrors;
a sensor having a surface to receive light rays reflected from the mirrors;
a first beamsplitter comprising a first partially-reflective surface configured to partially reflect light rays towards the mirrors; and
a second beamsplitter comprising a second partially-reflective surface configured to partially reflect light rays towards the mirrors;
wherein the first and second partially-reflective surfaces are aligned in sequence.

19. The apparatus of claim 18, wherein:
displacements on the surface of the sensor of the light rays reflected from the mirrors determine an intensity of radiation at corresponding locations of the mirrors; and
a respective displacement for each mirror is associated with an amount of radiation received by a radiation absorption surface of the respective mirror.

20. The apparatus of claim 18, wherein a light ray coming from a light source is split by the first beamsplitter to two light rays, and wherein one of the two light rays reflects from the first beamsplitter towards the mirrors and the other of the two light rays passes through the first beamsplitter towards the second beamsplitter.

* * * * *